United States Patent
Jung et al.

(10) Patent No.: US 11,038,212 B2
(45) Date of Patent: Jun. 15, 2021

(54) MODULE FOR REAL-TIME THERMAL BEHAVIOR ANALYSIS OF SECONDARY CELL BATTERY AND METHOD OF OPERATING THE SAME

(71) Applicant: Samsung Electronics Co., Ltd., Suwon-si (KR)

(72) Inventors: Changhoon Jung, Seoul (KR); Gahee Kim, Yongin-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 252 days.

(21) Appl. No.: 15/995,268

(22) Filed: Jun. 1, 2018

(65) Prior Publication Data
US 2019/0198937 A1 Jun. 27, 2019

(30) Foreign Application Priority Data
Dec. 22, 2017 (KR) .......................... 10-2017-0178739

(51) Int. Cl.
*H01M 10/42* (2006.01)
*H01M 10/625* (2014.01)
(Continued)

(52) U.S. Cl.
CPC ........... *H01M 10/4285* (2013.01); *B60L 3/12* (2013.01); *B60L 58/12* (2019.02); *H01M 10/625* (2015.04);
(Continued)

(58) Field of Classification Search
CPC ....................................................... B60L 3/12
See application file for complete search history.

(56) References Cited

U.S. PATENT DOCUMENTS 4,255,961 A * 3/1981 Biltonen ............ G01N 25/4866
374/11
2002/0021740 A1 * 2/2002 Danley .................. G01K 17/00
374/10
(Continued)

FOREIGN PATENT DOCUMENTS

JP       2016050797 A     4/2016
JP       2016217952 A    12/2016
(Continued)

OTHER PUBLICATIONS

Daniel Juarez-Robles et al. "Impedance Evolution Characteristics in Lithium-Ion Batteries." *Journal of the Electrochemical Society*, 164 (4) A837-A847 (2017).

*Primary Examiner* — Wyatt P McConnell
(74) *Attorney, Agent, or Firm* — Harness, Dickey & Pierce, P.L.C.

(57) ABSTRACT

Provided are a module for real-time thermal behavior analysis of a secondary cell battery and a method of operating the module. The module includes a region for mounting a sample battery, a region for mounting a reference battery, and a housing covering the two regions and having an adiabatic characteristic. The region for mounting the sample battery is defined by two partitions facing each other. In addition, the region for mounting the reference battery is defined by two partitions facing each other. The region for mounting the sample battery is a region for vertically or horizontally mounting the sample battery. The region for mounting the reference battery is a region for vertically or horizontally mounting the reference battery.

20 Claims, 11 Drawing Sheets

(51) Int. Cl.
*B60L 58/12* (2019.01)
*B60L 3/12* (2006.01)

(52) U.S. Cl.
CPC ..... *B60L 2240/545* (2013.01); *B60L 2260/42* (2013.01); *B60L 2260/44* (2013.01)

(56) References Cited

U.S. PATENT DOCUMENTS

| | | |
|---|---|---|
| 2010/0173186 A1 | 7/2010 | Kim et al. |
| 2012/0328938 A1 | 12/2012 | Geiculescu et al. |
| 2013/0089782 A1 | 4/2013 | Seung et al. |
| 2013/0252105 A1* | 9/2013 | Lee .................... H01M 4/0402 429/220 |

FOREIGN PATENT DOCUMENTS

| | | |
|---|---|---|
| JP | 6200755 B2 | 9/2017 |
| KR | 101596794 B1 | 3/2016 |
| WO | WO-2015174698 A1 | 11/2015 |

* cited by examiner

MODULE FOR REAL-TIME THERMAL BEHAVIOR ANALYSIS OF SECONDARY CELL BATTERY AND METHOD OF OPERATING THE SAME

CROSS-REFERENCE TO RELATED APPLICATION

This application claims the benefit of Korean Patent Application No. 10-2017-0178739, filed on Dec. 22, 2017, in the Korean Intellectual Property Office, the disclosure of which is incorporated herein in its entirety by reference.

BACKGROUND

1. Field

The present disclosure relates to modules for real-time thermal behavior analysis, and more particularly, to modules for real-time thermal behavior analysis of a secondary cell battery such as a lithium ion battery and methods of operating the modules.

2. Description of the Related Art

A lithium ion battery (LIB), which is a type of secondary battery, is used in various industries due to its high energy density. For example, LIBs are applied to various apparatuses, such as portable electronic devices, electric cars, power supply apparatuses, etc.

An LIB is a component for storage and supply of energy. Heat is generated in processes of storing energy in an LIB and discharging energy from an LIB. The heat generated from an LIB may be normal heat generated in a process of storing energy, that is, charging the LIB, and in a process of using energy, that is, discharging the LIB, but may be abnormal heat due to a structural change of an internal structure of the LIB. For example, the generation of abnormal heat from the LIB may be caused by structural instability in an overcharged state and consequent structural change, or electrode detachment from a current collector, etc.

SUMMARY

Some example embodiments include modules for real-time thermal behavior analysis of a secondary cell battery.

Some example embodiments include methods of operating the modules for real-time thermal behavior analysis of a secondary cell battery.

Additional aspects will be set forth in part in the description which follows and, in part, will be apparent from the description, or may be learned by practice of the presented example embodiments.

According to some example embodiments, a module for real-time thermal behavior analysis of a secondary cell battery includes: a region for mounting a sample battery; a region for mounting a reference battery; and a housing covering the two regions and having an adiabatic characteristic.

In the module, the region for mounting the sample battery may be defined by two partitions facing each other. Also, the region for mounting the reference battery may be defined by two partitions facing each other.

The region for mounting the sample battery may be a region configured to vertically or horizontally mount the sample battery.

The region for mounting the reference battery may be a region configured to vertically or horizontally mount the reference battery.

The module is configured to connect to a differential scanning calorimetry (DSC) and heat sensors included in the DSC may be exposed through the two regions, and the two regions may receive heat from the DSC.

The module for real-time thermal behavior analysis of a secondary cell battery may further include a first cover covering the region for mounting the sample battery and a second cover covering the region for mounting the reference battery.

The two regions may be provided in the same holder and through holes may be formed in the two regions of the holder, the through holes respectively having sizes which allow the sample battery and the reference battery to be supported therein.

Elastic members may respectively be arranged on surfaces of the two partitions facing each other.

According to some example embodiments, a method of analyzing a thermal behavior of a secondary cell battery in real time by using the module described above includes: mounting a sample battery in the region for mounting the sample battery and mounting a reference battery in the region for mounting the reference battery; charging and discharging the sample battery; and measuring a heat flux of the sample battery.

The mounting of the sample battery and the reference battery in the two regions may include mounting the sample battery and the reference battery in a vertical direction or a horizontal direction.

The charging and discharging of the sample battery may include increasing temperatures of the sample battery and the reference battery step by step while times for the charging and the discharging are maintained constant.

The charging and discharging of the sample battery may include changing a temperature of an environment of the sample battery and the reference battery while the sample battery is maintained in an idle state.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
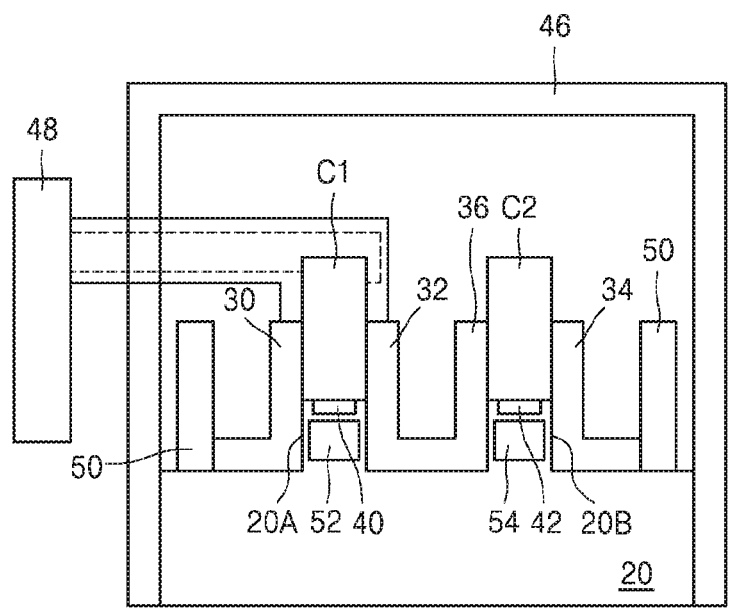
FIG. 1 is a cross-sectional view of a module for real-time thermal behavior analysis of a secondary cell battery, according to some example embodiments.

Heat generated from a secondary cell battery, such as an LIB may be one of reasons for reducing a performance and a lifetime of the secondary cell battery. Accordingly, as the understanding of materials (for example, cathode, anode, separation membrane, electrolyte, etc.) that constitute the secondary cell battery, charging and discharging processes of the secondary cell battery, and a heat generation phenomenon according to an operational environment of the secondary cell battery increase, it is easier to obtain solutions for reducing or minimizing abnormal heat generation or unexpected heat generation of the secondary cell battery, and as a result, a lifetime of the secondary cell battery may be increased.

In the related art, in order to understand a heat generation characteristic of a secondary cell battery like an LIB, elements that constitute the secondary cell battery are separated and then a thermal behavior, that is, a thermal change of each of the elements is analyzed. For this analysis, a differential scanning calorimeter (DSC) has been used.

The DSC is an apparatus that shows an energy difference between a sample material and a reference material as a function of temperature when temperatures of the sample material and the reference material are changed by applying the same temperature program.

In the DSC, the sample material and the reference material respectively are placed in metal containers referred to as pans. Variation of heat application and heat generation with respect to the sample material and the reference material may be observed through a thermal sensor configured of a thermocouple. Through the observation, physical and chemical changes of the sample material may be analyzed.

Variation of heat being emitted from a sample or variation of heat being absorbed by the sample while heating, cooling, or maintaining the sample at a constant temperature is detected by a DSC. Based on the detection, a phase change/decomposition, a chemical reaction, etc. of the sample material may be analyzed.

However, there is a limit in obtaining information from the analysis by using a DSC of the related art because the information is obtained from physical and chemical changes that occur in the corresponding sample as a result of applying a simple thermal change (heating and cooling) to raw materials to be analyzed.

In detail, although thermal behavior information according to thermal changes of respective constituent elements of a secondary cell battery like the LIB may be obtained by using a DSC of the related art, it is difficult to obtain thermal behavior information according to a thermal change of the secondary cell battery itself.

Furthermore, in the case of a secondary cell battery like the LIB, information about a thermal behavior of the secondary cell battery itself in various environments and various states in which the secondary cell battery is actually operated may be important. This information may be used as an important basal factor in designing a large cell battery or a battery for automobiles. However, it is difficult to obtain the information from a DSC of the related art.

Hereinafter, provided is a module for real-time thermal behavior analysis of a secondary cell battery in operation using a DSC of the related art.

Modules described below may be applied to a thermal behavior analysis of a secondary cell battery itself, and furthermore, may be applied to a thermal behavior analysis with respect to a unit structure (unit body) or a composite structure that shows a thermal behavior according to internal or external environment variation. For these applications, the size of the modules may be increased or reduced.

Hereinafter, a module for a real time thermal behavior analysis of a secondary cell battery according to an example embodiment and methods of operating the same will now be described in detail with reference to the accompanying drawings. In the drawings, thicknesses of layers and regions may be exaggerated for clarity of the specification. The methods of operation will be described together with the descriptions of the modules.

FIG. 1 is a cross-sectional view of a module for real-time thermal behavior analysis of a secondary cell battery, according to an example embodiment.

Referring to FIG. 1, reference numeral 20 may be a furnace block of a DSC. First and second protrusions 20A and 20B are present on an upper surface of the furnace block 20. The first and second protrusions 20A and 20B may have a constant shape. The first and second protrusions 20A and 20B are upwardly perpendicular to the upper surface of the furnace block 20. The first and second protrusions 20A and 20B are separated from each other. The first and second protrusions 20A and 20B may have the same length or different lengths from each other. The first and second protrusions 20A and 20B may be regions on which the module for real-time thermal behavior analysis of a secondary cell battery according to an example embodiment is mounted or coupled. Here, the mounted and coupled may include a case of inserting the module for a real time thermal behavior analysis of a secondary cell battery. For example, the first and second protrusions 20A and 20B may be members that are inserted or plugged into the modules for real-time thermal behavior analysis of a secondary cell battery. A first heater 52 may be included in the first protrusion 20A. A first heat sensor 40 is arranged on the first heater 52. The first heater 52 and the first heat sensor 40 are spaced apart from each other. The first heat sensor 40 may be provided in the first protrusion 20A in a buried state. In this case, a surface of the first heat sensor 40 may be exposed. The exposed surface of the first heat sensor 40 may contact a sample battery C1. The exposed surface of the first heat sensor 40 may have a height as the same level to an upper surface of the first protrusion 20A. The first heat sensor 40 may be arranged to cover an entire upper surface of the first protrusion 20A not in a buried state.

A second heater 54 is included in the second protrusion 20B. A second heat sensor 42 is arranged on the second heater 54. The second heater 54 and the second heat sensor 42 are spaced apart from each other. An arrangement of the second heat sensor 42 may be the same arrangement as the first heat sensor 40.

The module for real-time thermal behavior analysis of a secondary cell battery is arranged on the upper surface of the furnace block 20 around the first and second protrusions 20A and 20B.

In detail, two external walls 50 are arranged on the upper surface of the furnace block 20. The external walls 50 are spaced apart from each other. FIG. 1 is a cross-sectional view, and thus, the two external walls 50 are depicted as separated from each other, but actually, the two external walls 50 are a single unit that surrounds the first and second protrusions 20A and 20B. The first and second protrusions 20A and 20B are arranged between the two external walls 50. First and second partitions 30 and 32 are respectively arranged on both sides of the first protrusion 20A. The first partition 30 is arranged between the left-side external wall 50 and the first protrusion 20A. A lower part of a vertical part of the first partition 30 covers an entire left-side surface of the first protrusion 20A, and an upper surface of the first partition 30 extends upwards greater than a height of the first protrusion 20A. A horizontal part of the first partition 30 contacts the left-side external wall 50. The first partition 30 and the left-side external wall 50 may have the same height. The vertical part of the first partition 30 may parallel to the left-side external wall 50. The second partition 32 is arranged between the first and second protrusions 20A and 20B. A vertical part of the second partition 32 is parallel to the vertical part of the first partition 30. A lower part of the vertical part of the second partition 32 covers an entire right-side surface of the first protrusion 20A, and an upper surface of the second partition 32 extends upwards greater than a height of the first protrusion 20A. The second partition 32 includes a horizontal part extending in a right-side direction on the upper surface of the furnace block 20. The horizontal part of the second partition 32 is shared with an adjacent fourth partition 36. A space having a slot shape is defined above an upper surface of the first protrusion 20A by upper parts of the vertical parts of the first and second partitions 30 and 32. The sample battery C1 is inserted into the space. The sample battery C1 contacts the first heat sensor 40. Also, the sample battery C1 may contact the first and second partitions 30 and 32. When it is necessary to increase a temperature of the sample battery C1 in a process of measuring a thermal behavior of the sample battery C1, the sample battery C1 may receive heat from the first heater 52.

Next, a third partition 34 is arranged between the second protrusion 20B and the right-side external wall 50. The fourth partition 36 is arranged between the second protrusion 20B and the second partition 32. The second partition 32 and the fourth partition 36 are connected to each other through a horizontal part therebetween. A vertical part of the third partition 34 is parallel to the right-side external wall 50. The horizontal part of the third partition 34 covers the upper surface of the furnace block 20 between the third partition 34 and the right-side external wall 50. The horizontal part of the third partition 34 contacts the right-side external wall 50. A lower part of the third partition 34 covers an entire right-side surface of the second protrusion 20B. An upper unit of the third partition 34 upwardly extends higher than the second protrusion 20B. A lower part of a vertical part of the fourth partition 36 covers an entire left side surface of the second protrusion 20B. An upper part of the fourth partition 36 upwardly extends higher than the second protrusion 20B. A space above the upper surface of the second protrusion 20B is a defined space having a slot shape, due to the upper parts of the third partition 34 and the fourth partition 36 arranged on both sides of the second protrusion 20B. A reference battery C2 is inserted into the defined space, and the reference battery C2 contacts the second heat sensor 42. Also, the reference battery C2 contacts the third partition 34 and the fourth partition 36.

When it is necessary to supply heat to the reference battery C2 in a process of measuring a thermal behavior, heat may be supplied to the reference battery C2 by the second heater 54. A temperature-maintaining operation or a temperature-increasing operation of cells C1 and C2, that is, the sample battery C1 and the reference battery C2 may be performed by the first heater 52 and the second heater 54.

Whole of the members 30, 32, 34, 36, and 50 arranged on the upper surface of the furnace block 20 around the first and second protrusions 20A and 20B may be a single body. Also, the members 30, 32, 34, 36, and 50 arranged on the upper surface of the furnace block 20 may be, as a whole, a holder that supports the sample battery C1 and the reference battery C2 and may constitute a module used for analyzing thermal behavior of the secondary cell battery in real time.

The whole members 30, 32, 34, 36, and 50 arranged on the first and second protrusions 20A and 20B and the upper surface of the furnace block 20 around the first and second protrusions 20A and 20B are covered by a housing 46. The housing 46 may be transparent. The housing 46 may be a housing formed of a material having a high adiabatic property, that is, a high adiabatic characteristic. The housing 46 may be a constituent part of the module. The housing 46 may cover the furnace block 20. That is, the housing 46 may tightly contact side surfaces of the furnace block 20 and simultaneously adiabatic property is maintained between the housing 46 and the side surfaces of the furnace block 20. With the aid of the adiabatic property of the housing 46, a whole internal space of the housing 46 may be maintained at a constant temperature. Accordingly, the members 30, 32, 34, 36, and 50, the sample battery C1, and the reference batteries C2 that are covered by the housing 46 may be placed at a constant temperature atmosphere.

Reference numeral 48 is a device that provides a charge/discharge atmosphere to the sample battery C1, and may be a potentiostat. The device 48 may be arranged on an outside of the housing 46. In order to provide a charge/discharge atmosphere to the sample battery C1, the device 48 may be connected to the first and second partitions 30 and 32 (solid lines). Also, as indicted by dashed lines, the device 48 may be directly connected to the sample battery C1. The lines that connect the device 48 to the first and second partitions 30 and 32 are very fine, and the device 48 and the first and second partitions 30 and 32 may be connected through a lower part of the housing 46.

Figure 2:
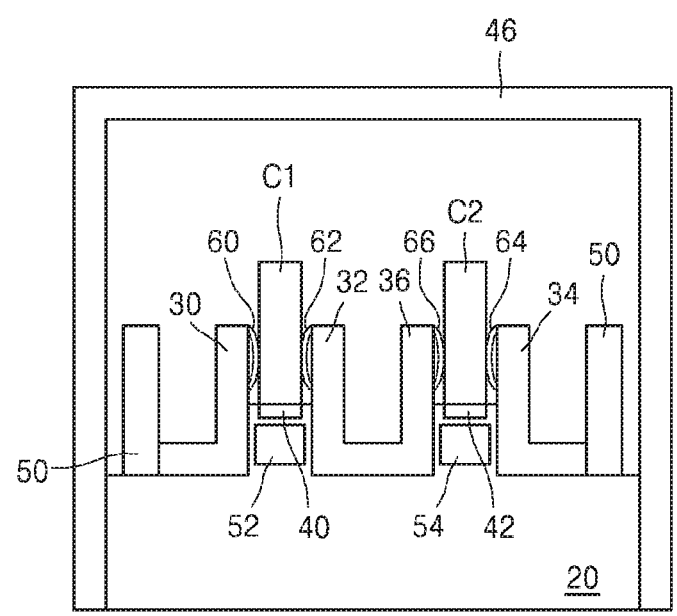
FIG. 2 is a cross-sectional view of a partially modified version of the module of FIG. 1.

FIG. 2 is a cross-sectional view of a partially modified version of the module of FIG. 1.

Referring to FIG. 2, elastic members 60 and 62 respectively are arranged on surfaces of the upper part of the first partition 30 and the upper part of the second partition 32 facing each other. The elastic members 60 and 62 are separated from the first protrusion 20A. With the aid of the elastic members 60 and 62, the sample battery C1 inserted between the first and second partitions 30 and 32 may be smoothly and fixedly held. Also, elastic members 64 and 66 may be provided on surfaces of the upper parts of the third and fourth partitions 34 and 36 facing each other. The elastic members 64 and 66 are separated from the second protrusion 20B. With the aid of the elastic members 64 and 66, the reference battery C2 may be smoothly mounted and may be fixedly held compared to when the elastic members 64 and 66 are not present.

Figure 3:
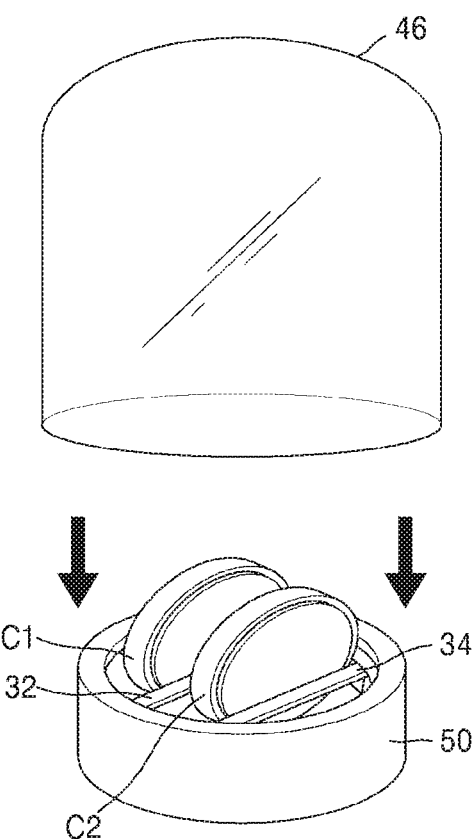
FIG. 3 is a perspective view of the module of FIG. 1.

FIG. 3 is a perspective view of the module of FIG. 1.

Referring to FIG. 3, the external wall 50 has a cylindrical shape that surrounds the first through fourth partitions 30, 32, 34, and 36.

Figure 4:
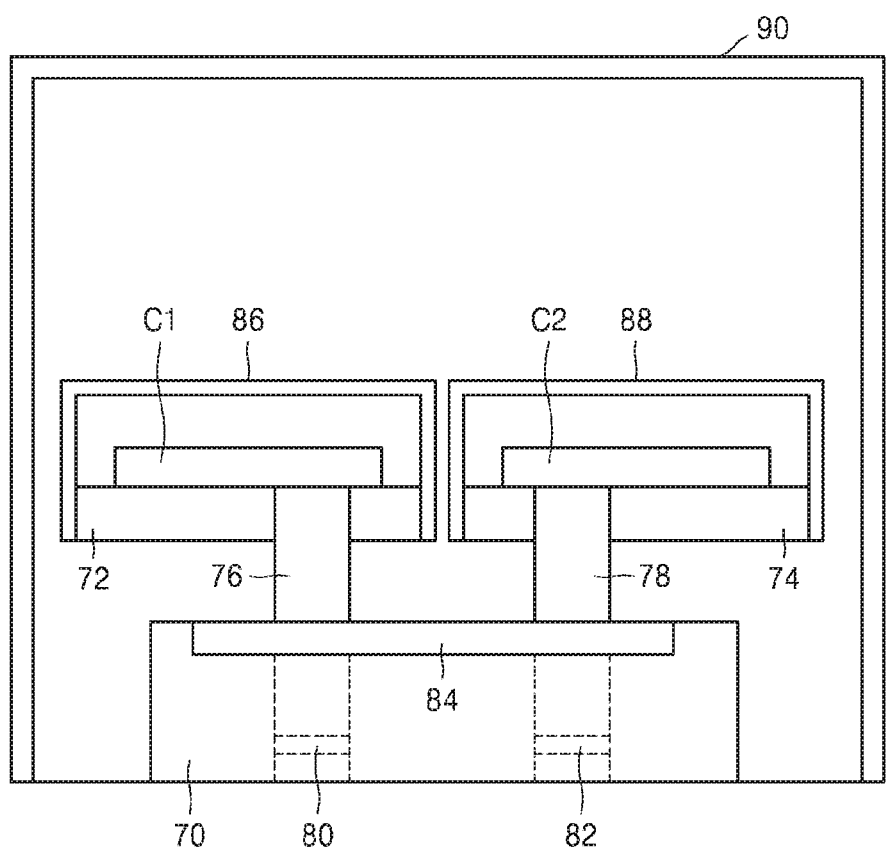
FIG. 4 is a cross-sectional view of a module for real-time thermal behavior analysis of a secondary cell battery, according to another example embodiment.

FIG. 4 is a cross-sectional view of a module for real-time thermal behavior analysis of a secondary cell battery, according to an example embodiment.

Referring to FIG. 4, first and second supporters 72 and 74 are arranged on a furnace 70. The furnace 70 and the first and second supporters 72 and 74 are spaced apart from each other. The sample battery C1 is mounted on the first supporter 72. The reference battery C2 is mounted on the second supporter 74. First and second columns 76 and 78 that connect the furnace 70 and the first and second supporters 72 and 74 are arranged between the furnace 70 and the first and second supporters 72 and 74. The first column 76 supports the first supporter 72. Also, the first column 76 performs a function of transferring heat from the furnace 70 to the sample battery C1 in a process of measuring a thermal behavior. Accordingly, the first column 76 may be formed of a material suitable for heat transfer. The first column 76 may be arranged so that an upper surface thereof contacts the sample battery C1 through the first supporter 72. A height of the upper surface of the first column 76 may be the same as an upper surface of the first supporter 72. The second column 78 supports the second supporter 74. The second column 78 may be arranged so that an upper surface thereof is exposed through the second supporter 74. A height of an upper surface of the second column 78 may be the same as the upper surface of the second supporter 74. Accordingly, the upper surface of the second column 78 may contact the reference battery C2 placed on the second supporter 74. In a process of measuring a thermal behavior, heat supplied from the furnace 70 may be supplied to the reference battery C2 through the second column 78. Accordingly, the second column 78 may be formed of a material suitable for heat transfer.

The first supporter 72 and the sample battery C1 are covered by a first cover 86. The second supporter 74 and the reference battery C2 are covered by a second cover 88. The first cover 86 covers a whole upper surface of the first supporter 72 and may cover side surfaces of the first supporter 72. The first cover 86 may be tightly coupled with the first supporter 72. For this purpose, both the first cover 86 and the first supporter 72 may be coupled by using a coupling method, such as a screw.

The second supporter 74 and the reference battery C2 are covered by the second cover 88. The second cover 88 may covers a whole upper surface of the second supporter 74 and may cover side surfaces of the second supporter 74. The second cover 88 may be tightly coupled with the second supporter 74. For this purpose, the second cover 88 may be coupled with the second supporter 74 by using a coupling method, such as a screw.

The first and second supporters 72 and 74 and the first and second covers 86 and 88 may be holders that accommodate and hold the sample battery C1 and the reference battery C2.

The first column 76 and the second column 78 may extend into the furnace 70. The furnace 70 may include heaters that heat the first column 76 and the second column 78 to supply heat to the sample battery C1 and the reference battery C2. The heaters may be provided in a form surrounding the first column 76 and the second column 78. The furnace 70 may include a fixing plate 84 for fixing the first column 76 and the second column 78. First and second heat sensors 80 and 82 may be arranged on lower parts of the first column 76 and the second column 78, respectively. The first and second heat sensors 80 and 82 detect heat generated from the sample battery C1 and the reference battery C2, respectively, in a process of measuring a thermal behavior. The first and second heat sensors 80 and 82 may be located under the heaters. The furnace 70, the first and the second columns 76 and 78, the first and second supporters 72 and 74, the sample battery C1, the reference battery C2, and the first and second covers 86 and 88 may be covered by a housing 90. The housing 90 may have the same adiabatic characteristic as the housing 46 of FIG. 1.

Figure 5:
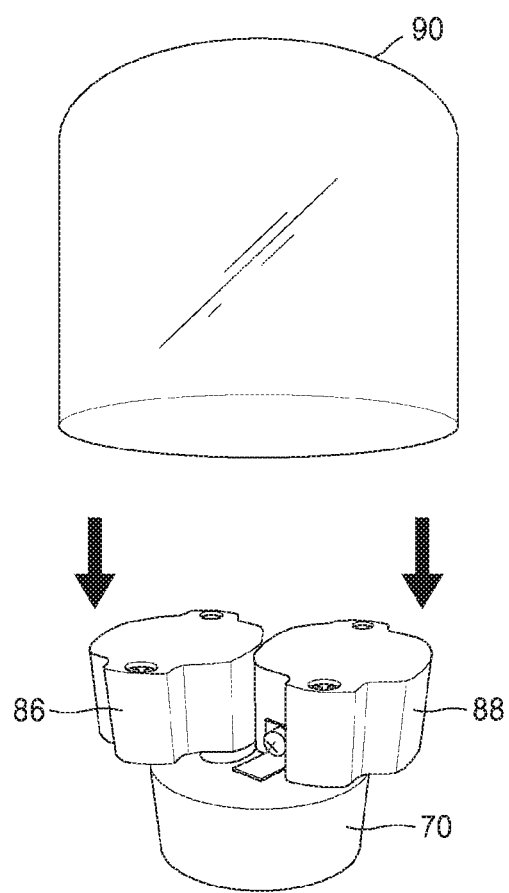
FIG. 5 is a perspective view of the module of FIG. 4.

FIG. 5 is a three-dimensional view of the module described with reference to FIG. 4.

Referring to FIG. 5, the first and second covers 86 and 88 have a shape similar to a cylindrical cover, and are screw coupled with the first and second supporters 72 and 74.

Figure 6:
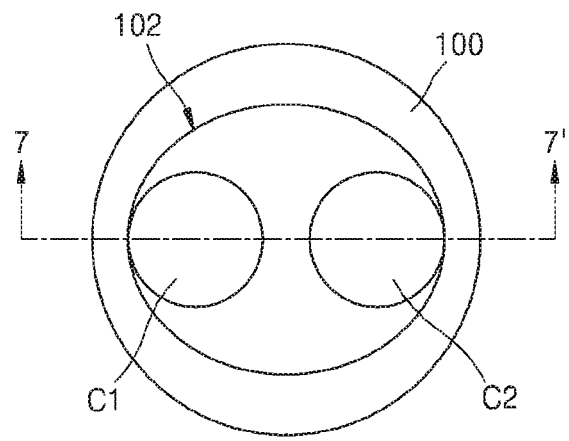
FIG. 6 is a cross-sectional view of a module for real-time thermal behavior analysis of a secondary cell battery, according to some example embodiments.

FIG. 6 is a cross-sectional view of a module for real-time thermal behavior analysis of a secondary cell battery, according to an example embodiment.

Referring to FIG. 6, a holder 100 has a battery mounting region 102. The sample battery C1 and the reference battery C2 are mounted in the battery mounting region 102. The sample battery C1 and the reference battery C2 are separated from each other in a horizontal direction.

Figure 7:
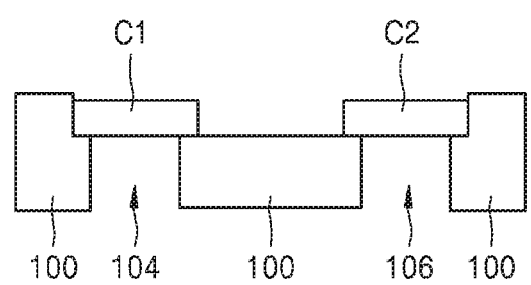
FIG. 7 is a cross-sectional view taken along line 7-7' of FIG. 6.

FIG. 7 is a cross-sectional view of the module of FIG. 6 cut in a 7-7' direction.

Referring to FIG. 7, first and second through holes 104 and 106 are formed in the holder 100. The first through hole 104 is formed in a region where the sample battery C1 is mounted, and the second through hole 106 is formed in a region where the reference battery C2 is mounted. When the sample battery C1 and the reference battery C2 are mounted, the first through hole 104 is covered by the sample battery C1 and the second through hole 106 is covered by the reference battery C2. The first through hole 104 has a diameter less than that of the sample battery C1. The second through hole 106 also has a diameter less than that of the reference battery C2. Accordingly, the sample battery C1 and the reference battery C2 respectively are supported by circumferential parts of the first and second through holes 104 and 106 of the holder 100.

Referring to FIGS. 6 and 7, the battery mounting region 102 is lower than an upper surface of the holder 100 around the battery mounting region 102. That is, the battery mounting region 102 in the holder 100 is concaved. Accordingly, when the sample battery C1 and the reference battery C2 are mounted in the holder 100, portions of side surfaces of the sample battery C1 and the reference battery C2 are covered by the holder 100.

In the module of FIGS. 6 and 7, heat sensors may be arranged on a lower side of the sample battery C1 and the reference battery C2, respectively, and contact the sample battery C1 and the reference battery C2. The heating of the sample battery C1 and the reference battery C2 may be performed below the sample battery C1 and the reference battery C2 through the first and second through holes 104 and 106, respectively.

Hereinafter, a measurement result of a thermal behavior of the sample battery C1 by using the module for real-time thermal behavior analysis of a secondary cell battery according to an example embodiment will be described. The sample battery C1 used for obtaining the measurement result is a battery including only a cathode. At this point, a cathode material was, for example, $LiNi_{0.33}Co_{0.33}Mn_{0.33}O_2$. The reference battery C2 includes only a battery case that does not include internal constituent members. Also, a potentiostat was used as a charge/discharge device with respect to the sample battery C1.

Figure 8:
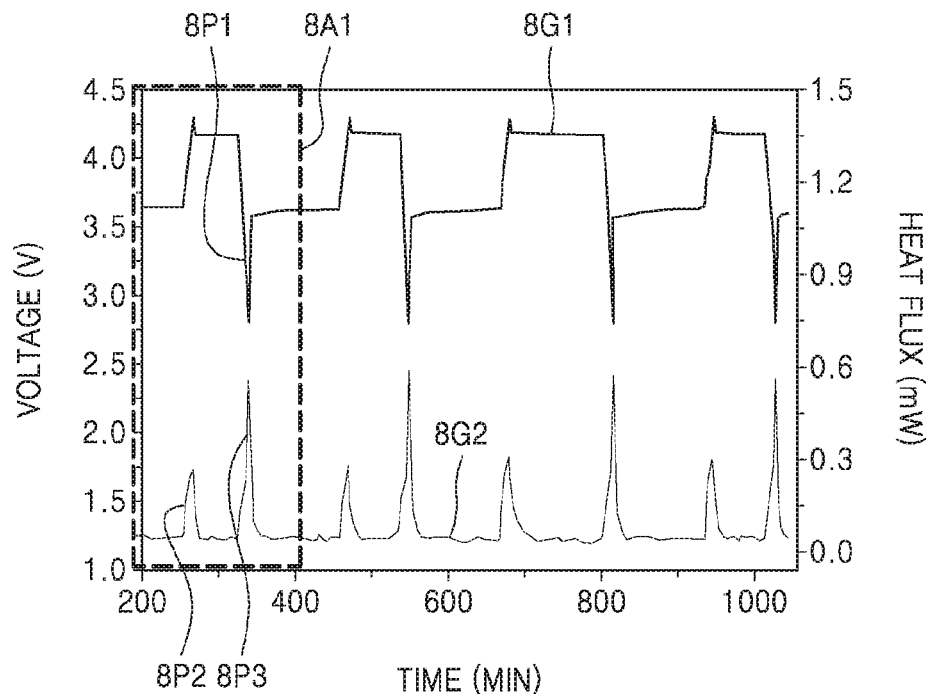
FIG. 8 is a graph showing thermal behavior of a secondary cell battery on which charge and discharge operations are performed under a 3C condition by using a module for real-time thermal behavior analysis of a secondary cell battery, according to some example embodiments.

FIG. 8 is a graph showing a thermal behavior of a secondary cell battery to which charge and discharge operations are performed under a 3C condition by using a module for real-time thermal behavior analysis of a secondary cell battery, according to an example embodiment. Here, 1C denotes that a time required for charging and discharging is one hour. The 3C condition denoted that the charge and discharge may be performed with a speed of three times faster than 1C.

In FIG. 8, a first graph (an upper graph) 8G1 shows a voltage variation when charge and discharge of the sample battery C1 are performed. A second graph (a lower graph) 8G2 indicates a heat flux showing a thermal behavior of the sample battery C1 when the sample battery C1 is charged and discharged.

Figure 15:
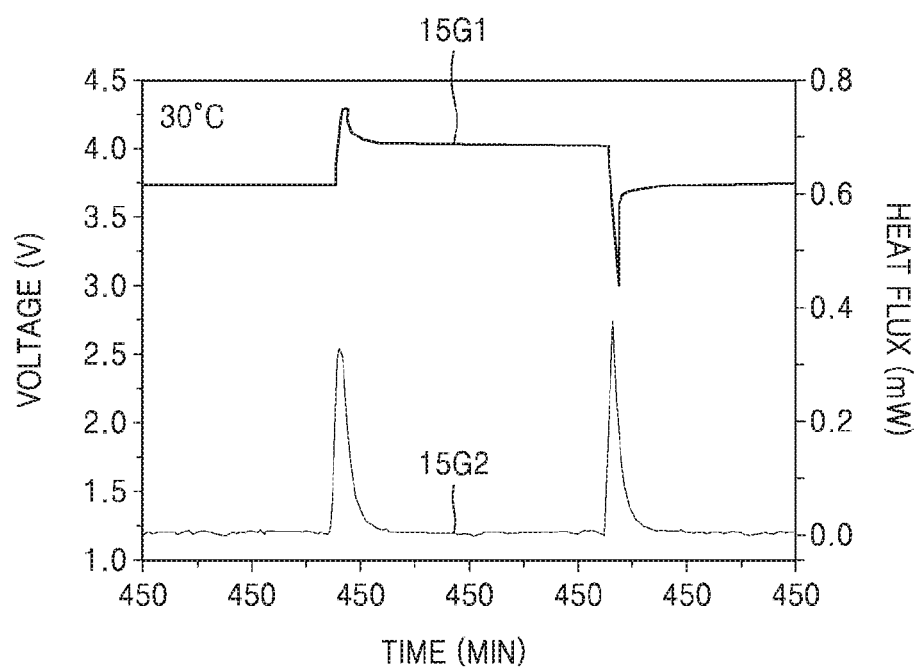
FIGS. 15 through 18 are graphs showing thermal behaviors of a secondary cell in an environment in which charge and discharge speeds of the secondary cell battery are kept constant and a temperature of an operational environment of the secondary cell battery is changed by using a module for real-time thermal behavior analysis of a secondary cell battery, according to some example embodiments.
Figure 16:
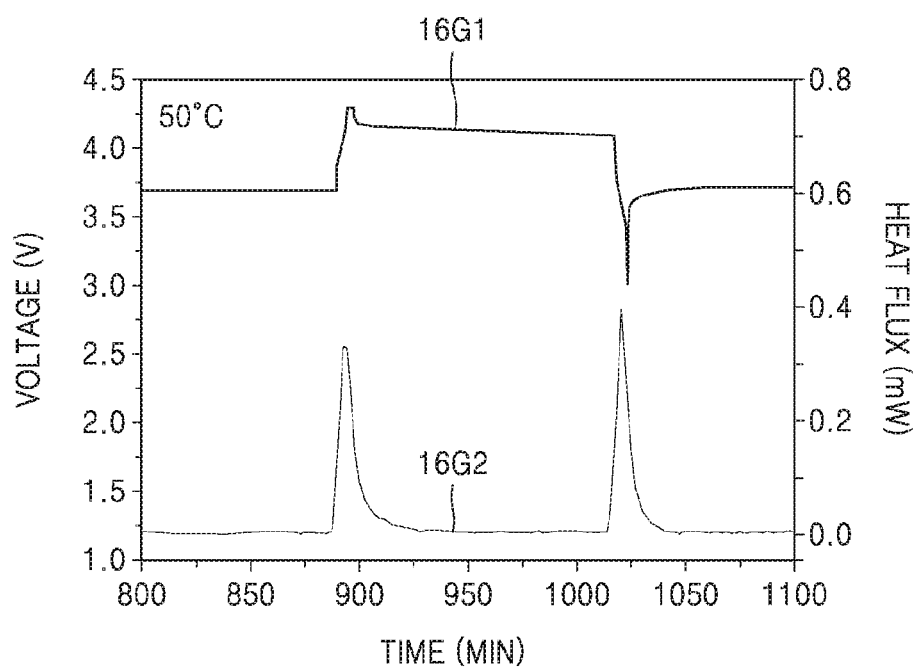
Figure 17:
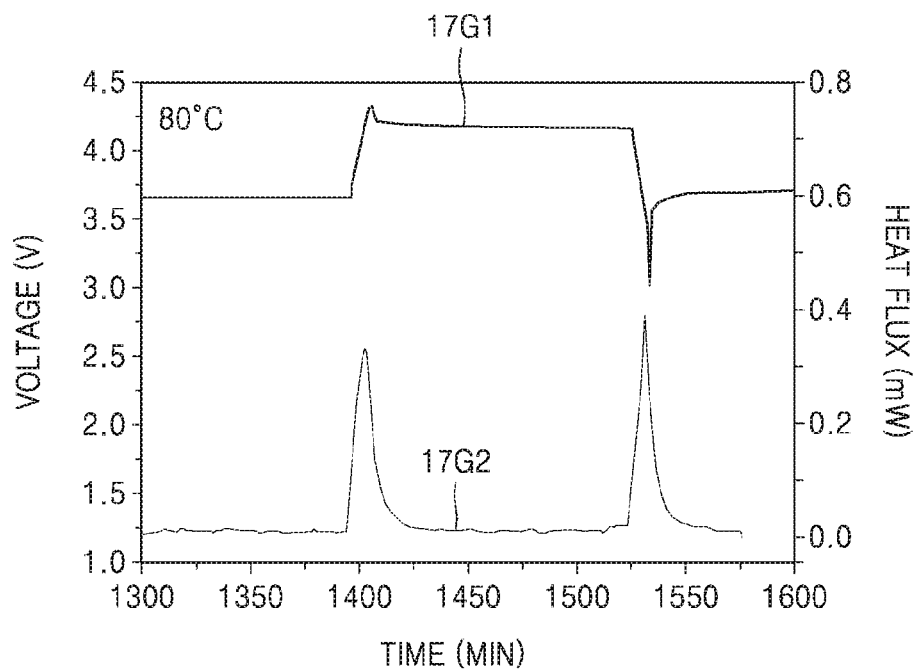

In FIG. 8, a horizontal axis indicates time (minute), a left-vertical axis indicates voltage, and a right-vertical axis indicates a heat flux, which are the same in FIGS. 9 through 13 and in FIGS. 15 through 17.

In the first graph 8G1, a first peak 8P1 is a downward peak when the sample battery C1 is discharged. In the second graph 8G2, a second peak 8P2 indicates a peak in response to discharging of the sample battery C1, and a third peak 8P3 indicates a peak in response to charging of the sample battery C1.

Referring to FIG. 8, at the same 3C charge/discharge condition, a heat flux generated from the sample battery C1 during four cycles shows a high reproducibility and reversibility.

Figure 9:
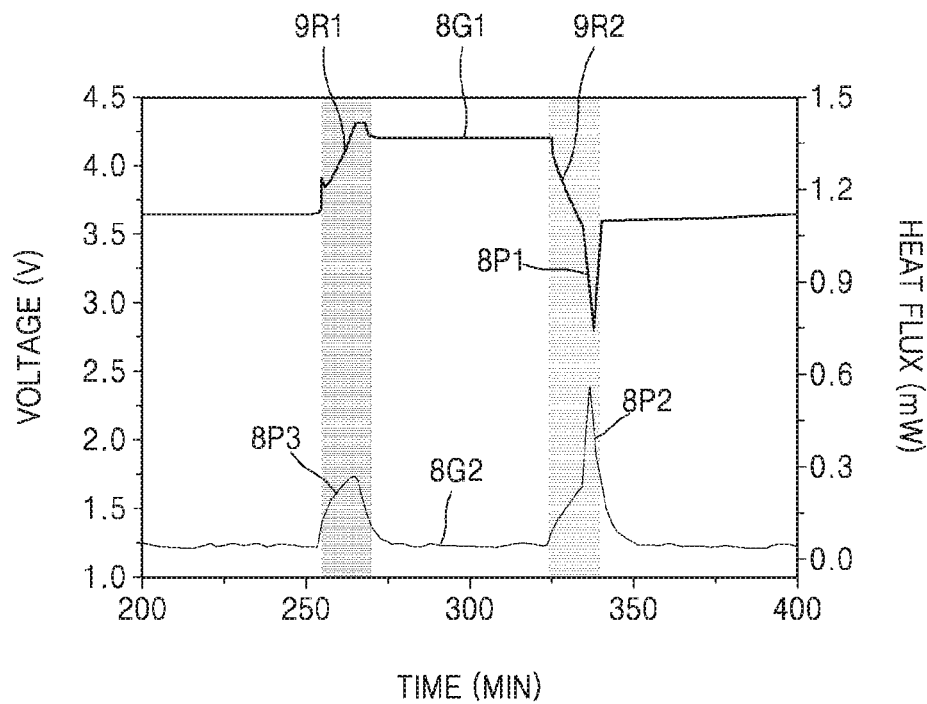
FIG. 9 is a magnified view of a first region of the graph of FIG. 8.

FIG. 9 is a magnified view of a first region 8A1 corresponding to a charge/discharge time of 200 minutes to 400 minutes of the graph of FIG. 8.

Referring to FIG. 9, heat peaks 8P3 and 8P2 correspond to a charge section 9R1 and a discharge section 9R2, respectively. In an idle section of the sample battery C1, that is, in a section in which charging and discharging of the sample battery C1 are not implemented, a heat peak is not generated.

FIGS. 10 through 13 are graphs showing a heat flux that indicates thermal behaviors of a secondary cell battery when charge and discharge speeds are varied by using a module for real-time thermal behavior analysis of a secondary cell battery, according to an example embodiment.

Figure 10:
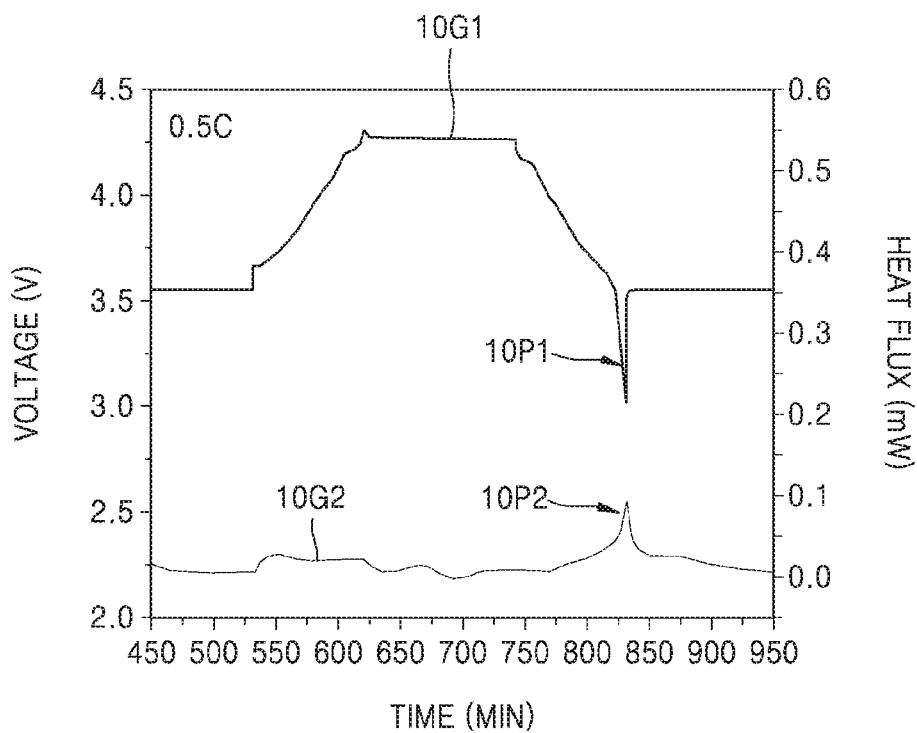
FIGS. 10 through 13 are graphs showing thermal behaviors of a secondary cell battery when charge and discharge speeds of the secondary cell battery are varied by using a module for real-time thermal behavior analysis of a secondary cell battery, according to some example embodiments.
Figure 11:
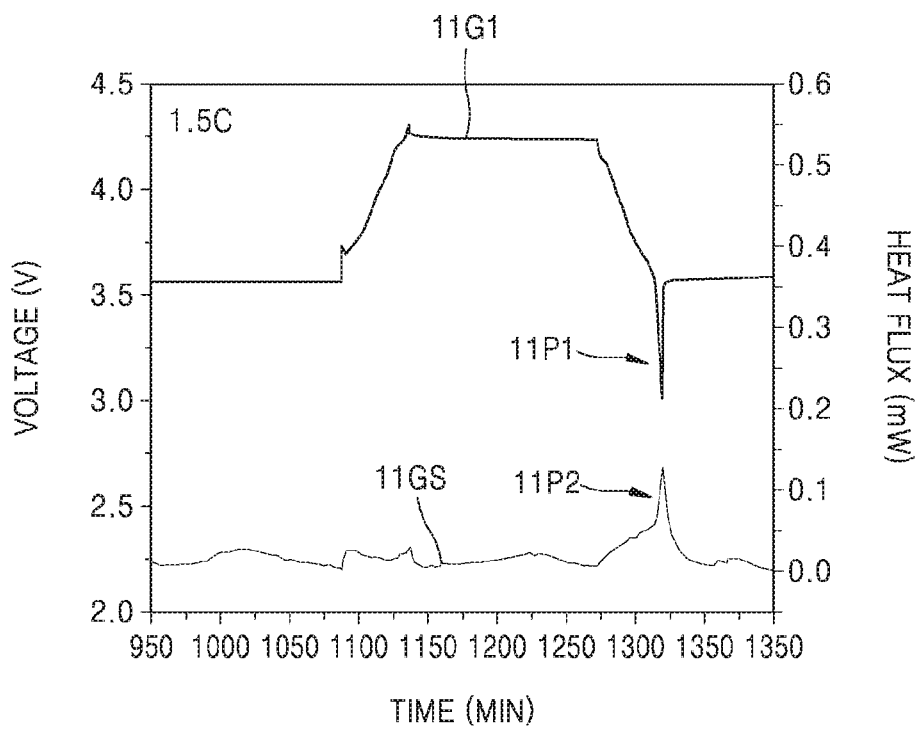
Figure 12:
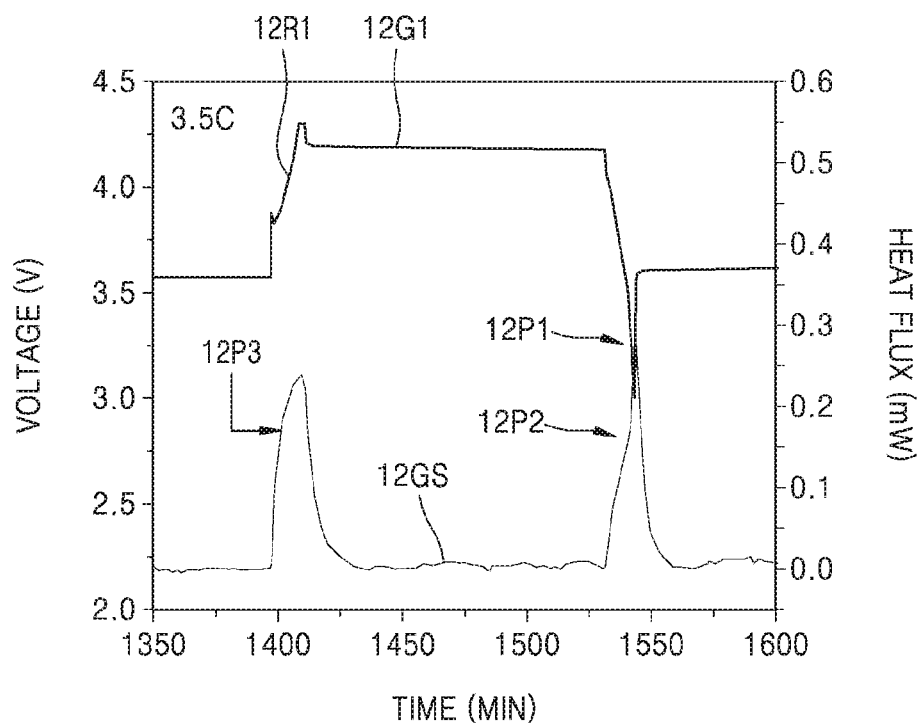
Figure 13:
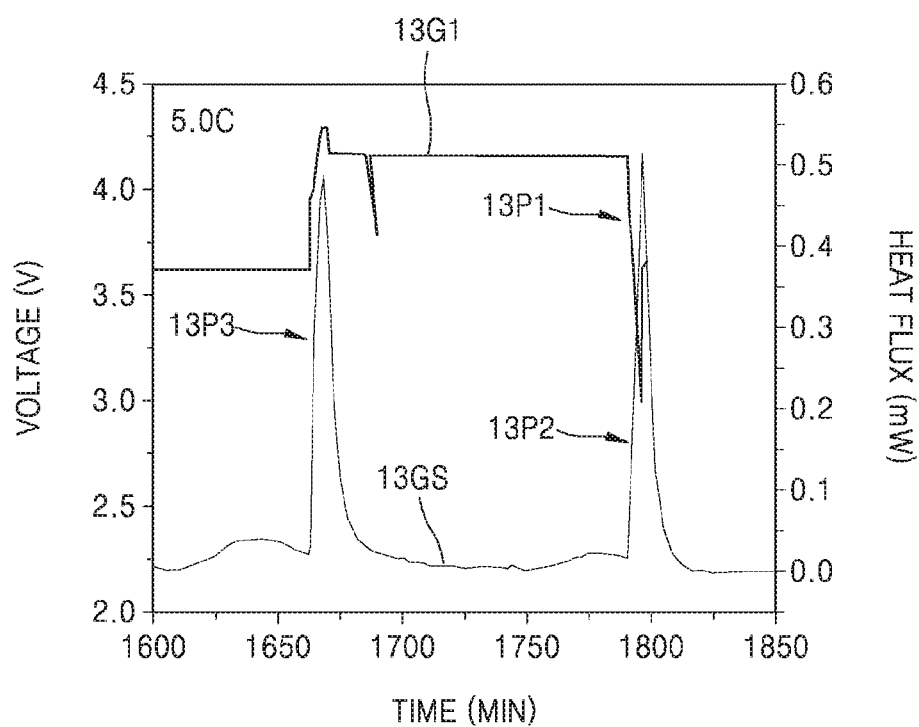

FIG. 10 shows a heat flux with respect to the sample battery C1 when a charging and discharging speed with respect to the sample battery C1 is 0.5C. FIGS. 11, 12 and 13 show heat fluxes when charge and discharge speeds are 10, 3C, and 5C, respectively.

In FIG. 10, a first graph (an upper graph) 10G1 shows a voltage variation of the sample battery C1 when the sample battery C1 is charged and discharged. A second graph (a lower graph) 10G2 indicates a heat flux showing a thermal behavior of the sample battery C1 when the sample battery C1 is charged and discharged. A heat peak 10P2 appears in the second graph 10G2 in response to a downward voltage peak 10P1 of the first graph 10G1 when the sample battery C1 is discharged.

In FIG. 11, a first graph (an upper graph) 11G1 shows a voltage variation of the sample battery C1 when the sample battery C1 is charged and discharged. A second graph (a lower graph) 11G2 indicates a heat flux showing a thermal behavior of the sample battery C1 when the sample battery C1 is charged and discharged. A heat peak 11P2 appears in the second graph 11G2 in response to a downward voltage peak 11P1 of the first graph 11G1 when the sample battery C1 is discharged.

In FIG. 12, a first graph (an upper graph) 12G1 shows a voltage variation of the sample battery C1 when the sample battery C1 is charged and discharged. A second graph (a lower graph) 12G2 indicates a heat flux showing a thermal behavior of the sample battery C1 when the sample battery C1 is charged and discharged. A heat peak 12P2 appears in the second graph 12G2 in response to a downward voltage peak 12P1 of the first graph 12G1 when the sample battery C1 is discharged. A heat peak 12P3 also appears in response to a charge section 12R1.

In FIG. 13, a first graph (an upper graph) 13G1 shows a voltage variation of the sample battery C1 when the sample battery C1 is charged and discharged. A second graph (a lower graph) 13G2 indicates a heat flux showing a thermal behavior of the sample battery C1 when the sample battery C1 is charged and discharged. A heat peak 13P2 appears in the second graph 13G2 in response to a downward voltage peak 13P1 of the first graph 13G1 when the sample battery C1 is discharged. A heat peak 13P3 also appears in response to a charge section.

Referring to FIGS. 10 through 13, as moved from FIG. 10 to FIG. 13, that is, as the charge and discharge speeds with respect to the sample battery C1 increase, it is seen that a change quantity of the heat flux increases in the charge and discharge sections. The result indicates that a larger amount of heat is generated under a rapid charge condition, such as a high speed charge.

Figure 14:
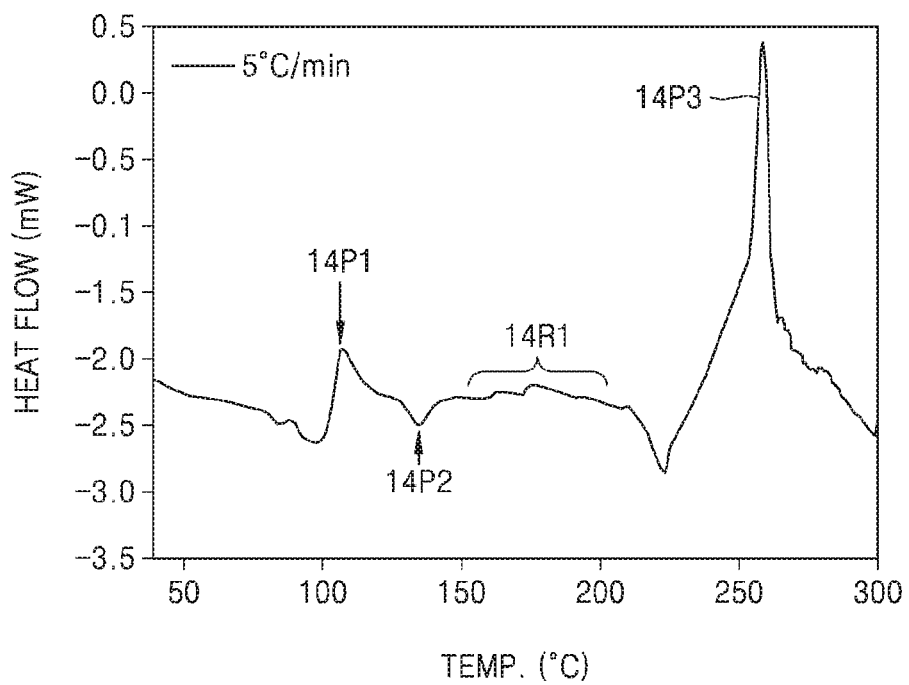
FIG. 14 is a graph showing thermal behavior measured from a secondary cell battery in an idle state in a temperature-changing environment by using a module for real-time thermal behavior analysis of a secondary cell battery, according to some example embodiments.

FIG. 14 shows a heat flux showing a thermal behavior of the sample battery C1 when temperatures of the sample battery C1 and the reference battery C2 are increased while the sample battery C1 is maintained at an idle state, that is, charge and discharge operations with respect to the sample battery C1 are not performed. At this point, a battery that includes all internal constituent elements of a battery was used as the sample battery C1. Also, in order to increase the temperatures of the sample battery C1 and the reference battery C2, a heater (for example, the first heater 52 or the second heater 54) included in the furnace of a DSC was used. A temperature increasing rate was maintained at 5° C. per minute.

In FIG. 14, a horizontal axis indicates temperature, and a vertical axis indicates heat flux.

In FIG. 14, a first peak 14P1 is resulted from a reaction of an electrolyte and a lithium salt, and a downward second peak 14P2 is resulted from melting of a separation film as a temperature increase. A third peak 14P3 which is a relatively large peak is resulted from the heat generation due to a cathode (binder+active material+LiPF6/electrolyte) reaction. A first section 14R1 of the graph is resulted from dissolution of the electrolyte as the temperature increase.

As depicted in FIG. 14, when the module for real-time thermal behavior analysis of a secondary cell battery, according to an example embodiment is used, a heat flux change due to state changes of internal constituent elements (for example, an electrolyte, a separation film, a cathode, etc.) of a sample battery C1 according to a temperature atmosphere change of the sample battery C1 may be measured in a single measurement.

FIGS. 15 through 17 are graphs showing thermal behaviors of a secondary cell battery measured by using a module for real-time thermal behavior analysis of a secondary cell battery, according to an example embodiment, when charge and discharge speeds of the secondary cell battery are kept constant and a temperature of an operational atmosphere of the secondary cell battery is changed. The sample battery C1 used for obtaining the results of FIGS. 15 through 17 may be the same as the sample battery C1 used for obtaining the result of FIG. 8.

In each of FIGS. 15 through 17, first graphs 15G1, 16G1, and 17G1 are charge and discharge graphs with respect to the sample battery C1, and second graphs 15G2, 16G2, and 17G2 indicate heat fluxes showing thermal behavior the sample battery C1.

FIG. 15 shows a result when a temperature atmosphere of the sample battery C1 is 30° C., FIG. 16 shows a result when a temperature atmosphere of the sample battery C1 is 50° C., and FIG. 17 shows a result when a temperature atmosphere of the sample battery C1 is 80° C.

Referring to FIGS. 15 through 17, heat peaks appear when the sample battery C1 is charged and discharged, and no heat peaks appear when the sample battery C1 is in an idle state between the charge and discharge of the sample battery C1.

Figure 18:
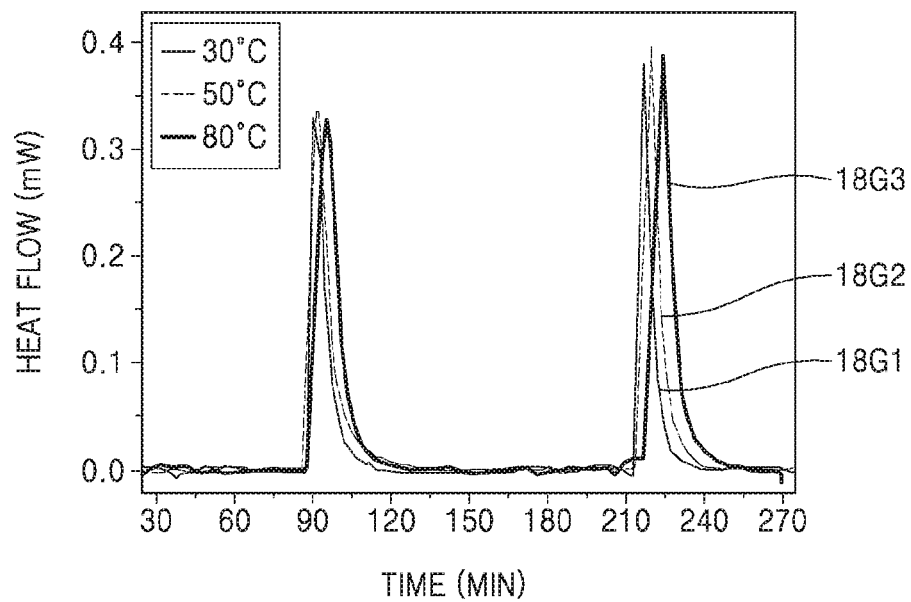

FIG. 18 shows a heat flux of the sample battery C1 when a temperature atmosphere of the sample battery C1 is 30° C., 50° C., and 80° C. A first graph 18G1 indicates a result when the temperature atmosphere is 30° C., a second graph 18G2 indicates a result when the temperature atmosphere is 50° C., and a third graph 18G3 indicates a result when the temperature atmosphere is 80° C. In each graph, a left-side peak indicates a heat peak appeared when the sample battery C1 is charged, and a right-side peak indicates a heat peak appeared when the sample battery is discharged.

Referring to FIG. 18, it is seen that the heat flux variation of the sample battery C1 according to the variation of a temperature atmosphere of the sample battery C1 is not large.

The module for real-time thermal behavior analysis of a secondary cell battery, according to an example embodiment, may be used for other purposes in addition to the use for analyzing thermal behavior. As an example, as depicted in FIG. 19, the variation of pressure or thickness of a battery may be measured by using the module for real-time thermal behavior analysis of a secondary cell battery.

Figure 19:
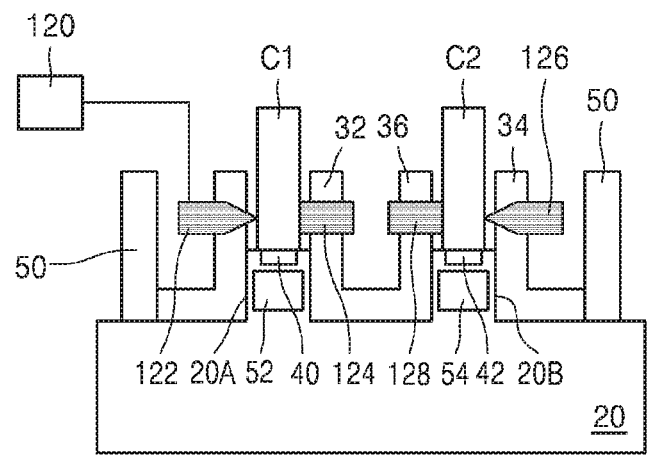
FIG. 19 is a cross-sectional view showing expansion of an application field of a module for real-time thermal behavior analysis of a secondary cell battery, according to some example embodiments.

Referring to FIG. 19, a first penetrating member 122 that penetrates through the upper part of the vertical part of the first partition 30, a second penetrating member 124 that penetrates through the upper part of the vertical part of the second partition 32, a third penetrating member 126 that penetrates through the upper part of the vertical part of the third partition 34, and a fourth penetrating member 128 that penetrates through the upper part of the vertical part of the first partition 36 are provided. The first and second penetrating members 122 and 124 may be configured to face each other with the sample battery C1 as a center. The third and fourth penetrating members 126 and 128 may be configured to face each other with the reference battery C2 as a center. The first penetrating member 122 and the second penetrating member 124 may be used for measuring the variation of pressure or thickness of the sample battery C1. A measuring device 120 is connected to the first penetrating member 122. The measuring device 120 is an apparatus for measuring the variation of pressure or thickness of the sample battery C1. The sample battery C1 may be a pouch type battery.

When the sample battery C1 and the reference battery C2 are heated by using the first heater 52 and the second heater 54, a thickness change or an expansion pressure of the sample battery C1 may vary according to an inner configuration of the sample battery C1. Through real-time measurement of the variation of thickness and pressure of the sample battery C1 by using the measuring device 120, a relationship between internal constituent elements of the sample battery C1 and a pressure variation of the sample battery C1, or between internal constituent elements of the sample battery C1 and a thickness variation of the sample battery C1 may be seen.

The module for real-time thermal behavior analysis of a secondary cell battery according to an example embodiment measures a thermal behavior with respect to a whole secondary cell battery, that is, a secondary cell battery itself. Accordingly, a thermal behavior of a secondary cell battery may be analyzed in real time, and a state of a thermal behavior of the secondary cell battery may be observed under various atmospheres in which the secondary cell battery is used. This analysis result may provide useful information in designing a secondary cell battery having an improved or optimum thermal behavior, and may provide useful information in designing a larger capacity battery and a battery for cars.

While one or more embodiments have been described with reference to the figures, it will be understood by those of ordinary skill in the art that various changes in form and details may be made therein without departing from the spirit and scope as defined by the following claims.

What is claimed is:

1. A module for real-time thermal behavior analysis of a sample battery, the module comprising:
   a region for mounting the sample battery;
   a region for mounting a reference battery;
   a housing covering the two regions and having an adiabatic characteristic; and
   a device configured to charge or discharge the sample battery,
   wherein the housing is a single body and partitions configured to define one of the regions are separated from each other.

2. The module of claim 1, wherein the region for mounting the sample battery is defined by the partitions including two partitions facing each other.

3. The module of claim 1, wherein the region for mounting the reference battery is defined by the partitions including two partitions facing each other.

4. The module of claim 1, wherein the region for mounting the sample battery is a region configured to vertically mount the sample battery.

5. The module of claim 1, wherein the region for mounting the reference battery is a region configured to vertically mount the reference battery.

6. The module of claim 1, wherein the region for mounting the sample battery is a region configured to horizontally mount the sample battery.

7. The module of claim 1, wherein the region for mounting the reference battery is a region configured to horizontally mount the reference battery.

8. The module of claim 1, wherein the module is configured to connect to a differential scanning calorimetry (DSC) and heat sensors included in the DSC are exposed through the two regions, and the two regions receive heat from the DSC.

9. The module of claim 1, further comprising:
   a first cover covering the region for mounting the sample battery; and
   a second cover covering the region for mounting the reference battery.

10. The module of claim 1, wherein the two regions are provided in the same holder and through holes are formed in the two regions of the holder, the through holes having sizes which allow the sample battery and the reference battery to be supported therein.

11. The module of claim 2, wherein elastic members are arranged on surfaces of the two partitions facing each other.

12. The module of claim 3, wherein elastic members are respectively arranged on surfaces of the two partitions facing each other.

13. A method of analyzing thermal behavior of a sample battery in real time, the method comprising:
   mounting the sample battery in a region for mounting the sample battery and mounting a reference battery in a region for mounting the reference battery;
   charging and discharging the sample battery; and
   measuring a heat flux of the sample battery.

14. The method of claim 13, wherein the mounting of the sample battery and the reference battery in the two regions comprises mounting the sample battery and the reference battery in a vertical direction or a horizontal direction.

15. The method of claim 13, wherein the charging and discharging of the sample battery comprises increasing temperatures of the sample battery and the reference battery step by step while times for the charging and the discharging are maintained constant.

16. The method of claim 13, wherein the charging and discharging of the sample battery comprises changing a temperature of an environment of the sample battery and the reference battery while the sample battery is maintained in an idle state.

17. The module of claim 1, wherein the device is a potentiostat.

18. The module of claim 1, further comprising:
   a sensor configured to detect a heat flux change caused by an internal element of the sample battery.

19. A module for real-time thermal behavior analysis of a sample battery, the module comprising:
   a region for mounting the sample battery;
   a region for mounting a reference battery; and
   a housing covering the two regions and having an adiabatic characteristic,
   wherein,
      the housing is a single body and partitions configured to define one of the regions are separated from each other, and
      the module further comprises the sample battery or the reference battery.

20. The module of claim 1, further comprising:
   a measuring device configured to measure a pressure variation or a thickness variation of the sample battery.

* * * * *